(12) United States Patent
Han et al.

(10) Patent No.: US 9,348,852 B2
(45) Date of Patent: May 24, 2016

(54) FREQUENT PATTERN MINING

(75) Inventors: Shi Han, Beijing (CN); Yingnong Dang, Beijing (CN); Song Ge, Beijing (CN); Dongmei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/095,415

(22) Filed: Apr. 27, 2011

(65) Prior Publication Data

US 2012/0278346 A1    Nov. 1, 2012

(51) Int. Cl.
*G06F 17/30* (2006.01)
(52) U.S. Cl.
CPC ............................ *G06F 17/30306* (2013.01)
(58) Field of Classification Search
CPC .................................................. G06F 17/30306
USPC .................................................. 707/758, 776
See application file for complete search history.

(56) References Cited

U.S. PATENT DOCUMENTS

| | | | |
|---|---|---|---|
| 6,675,164 B2 | 1/2004 | Kamath et al. |
| 7,178,132 B2 | 2/2007 | Pierce |
| 7,320,125 B2 | 1/2008 | Elliott et al. |
| 7,610,514 B2 | 10/2009 | Modani et al. |
| 7,644,397 B2 | 1/2010 | Warren et al. |
| 7,657,875 B2 | 2/2010 | Alexander, III et al. |
| 7,703,074 B2 | 4/2010 | Kamen et al. |
| 7,730,460 B1 | 6/2010 | Warren et al. |
| 7,739,553 B2 | 6/2010 | Bendapudi et al. |
| 7,818,799 B2 | 10/2010 | Chen et al. |
| 7,823,006 B2 | 10/2010 | Grant et al. |
| 2002/0138529 A1 | 9/2002 | Yang-Stephens et al. |
| 2003/0101161 A1 | 5/2003 | Ferguson et al. |
| 2005/0049990 A1 | 3/2005 | Milenova et al. |
| 2006/0080446 A1 | 4/2006 | Bahl |
| 2006/0218132 A1 | 9/2006 | Mukhin et al. |
| 2007/0022142 A1 | 1/2007 | Palmer et al. |
| 2007/0143759 A1 | 6/2007 | Ozgur et al. |
| 2007/0283338 A1 | 12/2007 | Gupta et al. |
| 2008/0082968 A1 | 4/2008 | Chang et al. |
| 2008/0155350 A1 | 6/2008 | Ivanov et al. |
| 2009/0006378 A1 | 1/2009 | Houle |
| 2009/0006883 A1 | 1/2009 | Zhang et al. |
| 2009/0083248 A1 | 3/2009 | Liu et al. |

(Continued)

OTHER PUBLICATIONS

Bartz, et al., "Finding Simliar Failures Using CallStack Similarity", SysMI'08 Proceedings of the 3rd Conference on Tackling computer system problems with machine learning techniques, USENIX Association, 2008, 6 pages.

(Continued)

*Primary Examiner* — Huawen Peng
(74) *Attorney, Agent, or Firm* — Steve Wight; Sandy Swain; Micky Minhas

(57) ABSTRACT

A system for frequent pattern mining uses two layers of processing: a plurality of computing nodes, and a plurality of processors within each computing node. Within each computing node, the data set against which the frequent pattern mining is to be performed is stored in shared memory, accessible concurrently by each of the processors. The search space is partitioned among the computing nodes, and sub-partitioned among the processors of each computing node. If a processor completes its sub-partition, it requests another sub-partition. The partitioning and sub-partitioning may be performed dynamically, and adjusted in real time.

20 Claims, 4 Drawing Sheets

(56) References Cited

U.S. PATENT DOCUMENTS

| | | | |
|---|---|---|---|
| 2009/0099988 | A1 | 4/2009 | Stokes et al. |
| 2009/0187791 | A1 | 7/2009 | Dowling et al. |
| 2009/0228685 | A1 | 9/2009 | Wei et al. |
| 2009/0307439 | A1* | 12/2009 | Jacobs et al. ............... 711/153 |
| 2009/0320021 | A1 | 12/2009 | Pan et al. |
| 2010/0107145 | A1 | 4/2010 | Warren et al. |
| 2010/0169026 | A1 | 7/2010 | Sorenson et al. |
| 2010/0174670 | A1 | 7/2010 | Malik et al. |
| 2012/0011112 | A1 | 1/2012 | Bian et al. |

OTHER PUBLICATIONS

Brodie, et al., "Quickly Finding Known Software Problems via Automated Symptom Matching", The Computer Society, Proceedings of the Second International Conference on Autonomic Computing (ICAC'05) 2005, 10 pages.

Buehrer, et al., "Adaptive Parallel Graph Mining for CMP Architectures," International Conference on Data Mining (ICDM'06), Dec. 18-22, 2006, Published Jan. 8, 2007, retrieved at <<http://www.cse.ohio-state.edu/~tatikond/work/parallel/greg-icdm.pdf>>, pp. 1-10.

Cong, et al., "A Sampling-based Framework for Parallel Data Mining," PPoPP'05, Jun. 15-17, 2005, Chicago, Illinois, USA, Copyright 2005 ACM, retrieved at <<http://www.cs.uiuc.edu/class/fa06/cs498dp/papers/ppopp.pdf>>, 11 pages.

Cong, et al., "Parallel Mining of Closed Sequential Patterns," KDD'05, Aug. 21-24, 2005, Chicago, Illinois, USA, Copyright 2005, retrieved at <<http://www.cs.uiuc.edu/class/fa05/cs591han/kdd05/docs/p562.pdf>>, pp. 562-567.

Guralnik, et al., "Dynamic Load Balancing Algorithms for Sequence Mining," May 4, 2001, retrieved from <<http://glaros.dtc.umn.edu/gkhome/fetch/papers/sc2001tp.pdf>>, pp. 1-8.

Huck, et al., "PerfExplorer: A Performance Data Mining Framework For Large-Scale Parallel Computing", SCI'05 Nov. 2005, Seattle, WA USA, 12 pages.

Jinlin, et al., "Parallel Research of Sequential Pattern Data Mining Algorithm," 2008 International Conference on Computer Science and Software Engineering, retrieved at <<http://ieeexplore.ieee.org/stamp/stamp.jsp?tp=&arnumber=4722632>>, pp. 348-353.

Liu, et al., "A Systematic Study of Failure Proximity", IEEE Transactions on Software Engineering, vol. 32, No. 6, Nov./Dec. 2008, pp. 826-843.

Takaki, et al., "A New Dynamic Load Balancing Technique for Parallel Modified PrefixSpan with Distributed Worker Paradigm and Its Performance Evaluation," High-Performance Computing, Lecture Notes in computer Science, 2008, vol. 4759/2008, retrieved at <<http://www.springerlink.com/content/t8nr70h55uvw6r42/fulltext.pdf>>, 11 pages.

Wang, et al. "BIDE: efficient mining of frequent closed sequences", Data Engineering, 2004. Proceedings, 20th International Conference, 79-90.

LaRosa et al., "Frequent Pattern Mining for Kernel Trace Data," SAC, 2008, 6 pages.

Office action for U.S. Appl. No. 13/095,269, mailed on Apr. 1, 2013, Han et al., "Analyzing Software Performance Issues," 10 pages.

Xie et al., "Data Mining for Software Engineering," IEEE Computer Society, 2009, 8 pages.

Liu, et al., "Mining Behavior Graphs for "Backtrace" of Noncrashing Bugs", retrieved on Dec. 5, 2013 at <<http://citeseerx.ist.psu.edu/viewdoc/summary?doi=10.1.1.75.5187>>, 2005 SIAM International Conference on Data Mining (SDM'05), pp. 286-297.

Office action for U.S. Appl. No. 13/095,336, mailed on Dec. 13, 2013, Han, et al., "Analyzing Program Execution", 22 pages.

Office action for U.S. Appl. No. 13/095,336, mailed on Apr. 3, 2014, Han et al., "Analyzing Program Execution", 30 pages.

Joachims, "Support Vector Machine for Ranking," Cornell University Dept. of Computer Science, 2009, 3 pages.

Lo et al., "Mining and Ranking Generators of Sequential Patterns," SIAM, 2005, 12 pages.

Office action for U.S. Appl. No. 13/095,336, mailed on Aug. 20, 2014, Han et al., "Analyzing Program Execution", 29 pages.

Non-Final Office Action for U.S. Appl. No. 13/095,336, mailed on May 23, 2014, Han et al., "Analyzing Program Execution", 25 pages.

Office action for U.S. Appl. No. 13/095,336, mailed on May 13, 2015, Ham et al., "Analyzing Program Execution", 35 pages.

Non-Final Office Action for U.S. Appl. No. 13/095,336, mailed on Nov. 18, 2014, Han, et al., "Analyzing Program Execution", 32 pages.

Office action for U.S. Appl. No. 13/095,336, mailed on Sep. 24, 2015, Han et al., "Analyzing Program Execution", 36 pages.

* cited by examiner

FREQUENT PATTERN MINING

BACKGROUND

"Frequent patterns" are sequences of data items that occur in a database at a relatively high frequency. Data items may be numbers, characters, strings, names, records, and so forth.

Discovery of frequent patterns, also referred to as frequent pattern searching or mining, has become important in many fields, and it is often desired to find frequently occurring patterns in very large data sets.

One way to visualize the process of pattern mining is as a hierarchical graph or tree of patterns and sub-patterns. Suppose, for example, that it is desired to find frequently occurring character patterns in a text. A first pass might identify all single characters that might form the beginning of a character pattern. These "candidate" items would form the first level of a hierarchical tree structure. A second pass might then add a second, dependent level to the hierarchical tree structure. The second pass would find, for each first-level candidate item, all single characters or strings that occur subsequent to the first-level candidate item. This process would then be iterated to add further sub-levels to the hierarchical tree, which could eventually be examined to find those strings or patterns that occur most frequently.

Many algorithms are available for implementing the process of searching for frequently occurring patterns. However, frequent pattern mining against large databases is computationally expensive and time consuming. Accordingly, efforts have been made to utilize multiple computers or computing nodes, running in parallel, to speed the process. A traditional approach to distributing tasks among computing nodes might be to partition the search space into many sub-search spaces, and utilize available computing nodes to search the partitions in parallel. However, it can be difficult to predict the amount of work that will be involved in processing any particular partition, and it is therefore difficult to create partitions in such a way that each computing node will have the same amount of work. The resulting unbalanced partitioning tends to decrease the efficiency of parallel pattern mining algorithms.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

SUMMARY

Frequent pattern mining is conducted using a two-layer architecture. A first level of tasks is distributed to a plurality of computing nodes: the search space is partitioned, and one or more of the resulting partitions are assigned to each of the computing nodes. Each computing node has a plurality of processors.

A second level of tasks is distributed to the processors within the computing nodes: the partition of the search space assigned to a particular computing node is sub-partitioned, and one or more sub-partitions are assigned to each of the processors of the computing node.

The frequent pattern mining is conducted against a data set that is stored in shared high-speed memory of each of the computing nodes, for concurrent or shared access by the processors of each computing node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
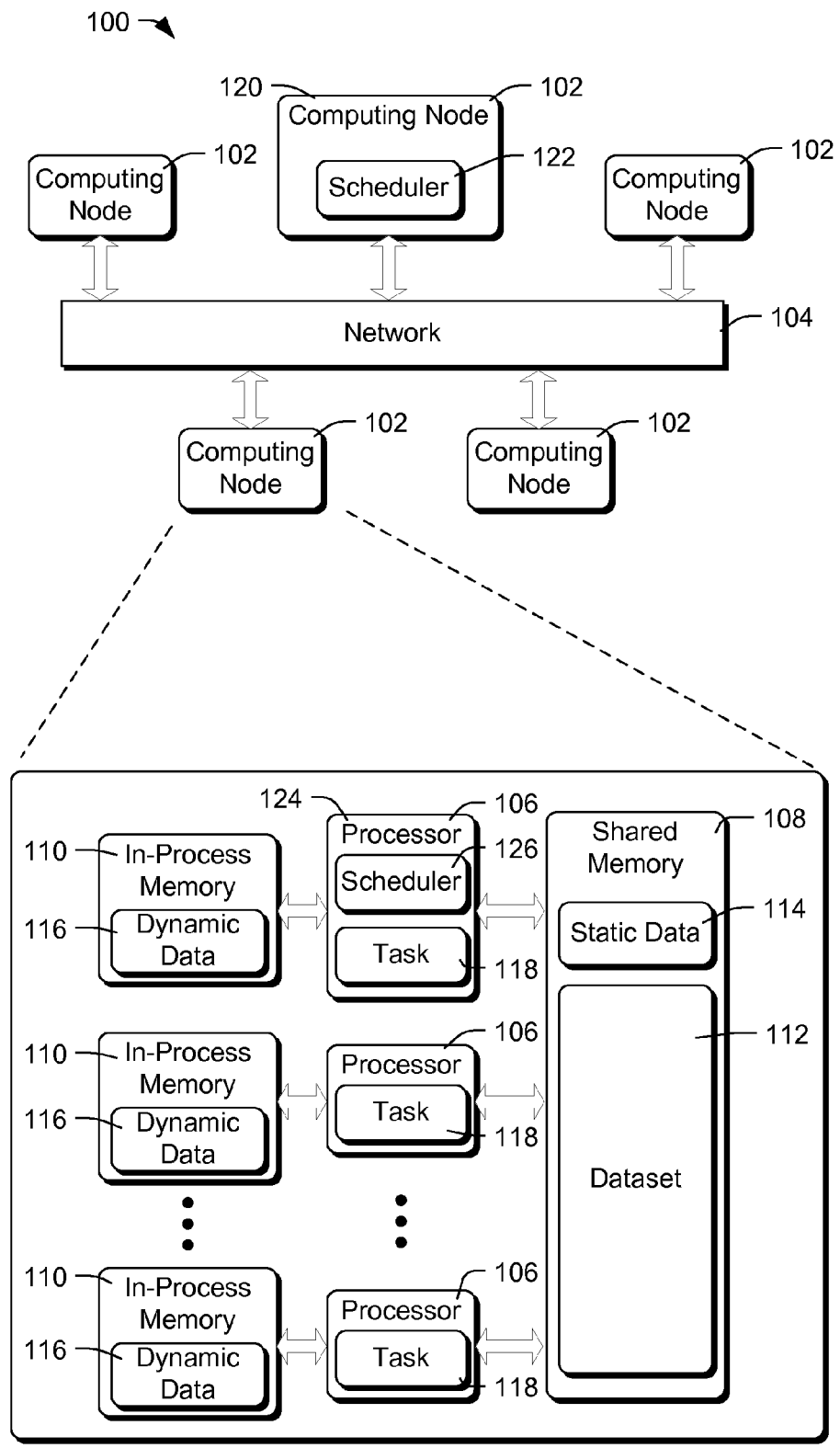
FIG. 1 is a block diagram of an example system for mining frequently occurring patterns.

FIG. 1 shows an example of a computer system 100 configured to perform frequent pattern mining among items of a data set. The computer system 100 includes two levels or layers of computing entities. At a first level, a plurality of computing nodes 102 communicate with each other over a network 104 or other type of communication channel. At a second level, each of the computing nodes 102 has multiple processors that perform portions of the frequent pattern mining.

The lower portion of FIG. 1 shows an example configuration of a single computing node 102. Each of the computing nodes 102 has generally the same configuration.

Each computing node 102 may comprise a conventional computer having multiple processors or CPUs (central processing units) 106. For example, a single computing node may utilize 16 or more processors. Each computing node 102 may also have various types of memory, some of which may be used or allocated as shared memory 108 and as in-process memory 110.

The shared memory 108 and in-process memory 110 in many embodiments may comprise electronic and/or semiconductor memory such as volatile, randomly-addressable memory or RAM that is accessible locally to the computing node 102 by means of a local bus or communications channel (not shown). This type of memory is frequently referred to as the computer's "RAM," and in many embodiments will be formed by high-speed, dynamically-refreshed semiconductor memory.

Each computing node 102 may also have access to other types of memory (not shown), including read-only memory (ROM), non-volatile memory such as hard disks, and external memory such as remotely located storage, which may provide access to various data, data sets, and databases. Various computing nodes 102 may also be capable of utilizing removable media.

In the described embodiment, the shared memory 108 is accessible concurrently by all of the processors 106, and contains a data set 112 which is to be the object of a frequently-occurring pattern search. The data set 112 may in some embodiments take the form of a structured database. For example, the data set 112 may comprise a SQL (structured query language) database or some other type of relational database that is accessible using conventional database query languages.

The data set 112 contains a plurality of data items, and each data item is formed by one or more elements. The individual data items may comprise text, strings, records, and so forth. Elements within data items may comprise characters, words, lines, names, etc. The object of frequent pattern mining is to identify patterns of elements that occur frequently in different items of the data set. For example, it may be desired to find the sequences of characters that occur most frequently in string items, or to find frequently occurring sequences of function names that occur in program execution logs.

The shared memory 108 may also contain pre-calculated, static data 114 related to or used by frequent pattern mining algorithms.

Both the data set 112 and the pre-calculated, static data 114 may be accessed by any of the processors 106.

Because of the decreasing cost and increasing densities of computer memory, the shared memory 108 may be quite large. In current embodiments, the combined shared memory 108 and in-process memory 110 may be 48 gigabytes or more, which is large enough to contain a very large data set without needing memory swapping or paging. Future technologies will undoubtedly increase the practical amounts of RAM available within single computing nodes.

While the shared memory 108 is accessible in common by the multiple processors 106, each instance of the in-process memory 110 is dedicated and private to an individual one of the processors 106 or to one or more of the processes being executed by the processors. The in-process memory 110 stores dynamic variables 116 and other data that may be generated and maintained by processes executed by the processors 106. Note that the in-process memory 110 may in some embodiments include paged memory.

The embodiment described herein utilizes task partitioning, so that frequent pattern mining can be partitioned and performed in parallel by different computing nodes 102 and processors 106. Using this approach, each processor 106 of a single computing node 102 has access to all records or data items of the data set, but is responsible for a different portion or partition of the search space.

Tasks are assigned in two stages. At a first stage, the work of a frequent pattern search is divided into multiple tasks, which are assigned to computing nodes. At a second stage, each of these tasks is divided into sub-tasks, which are assigned to individual processors of the computing nodes. The task division may be performed at a level of granularity that allows a number of tasks or sub-tasks to be reserved for future assignment as computing nodes or processors complete their current assignments.

Each task involves searching for frequent patterns in a partition or sub-partition of the overall search space. Partitioning and sub-partitioning are performed with an effort to produce partitions and sub-partitions of equal size, so that computing nodes and processors are assigned equal amounts of work. To account for estimation inaccuracies, initial partitions and sub-partitions can be made sufficiently small so that some partitions and sub-partitions are held in reserve, for future assignment. When a computing node or processor completes its current assignment, it may request a further assignment. This request may be satisfied by the assignment of an as-yet unassigned partition or sub-partition, if available. If no unassigned partitions or sub-partitions are available, the system may re-partition or sub-partition an existing assignment, and may reassign one of the resulting partitions or sub-partitions to a requesting computing node or processor.

The searching itself can be performed in different ways, using various algorithms. For example, certain embodiments may utilize the frequent pattern mining algorithm described in the following published reference:

Jianyong Wang and Jiawei Han. 2004. BIDE: Efficient Mining of Frequent Closed Sequences. In *Proceedings of the 20th International Conference on Data Engineering* (ICDE '04). IEEE Computer Society, Washington, D.C., USA, 79-.

Other algorithms might also be used.

A frequent pattern mining algorithm such as this involves building a hierarchical pattern tree by exploration, starting with high levels and building through lower and yet lower levels.

Figure 2:
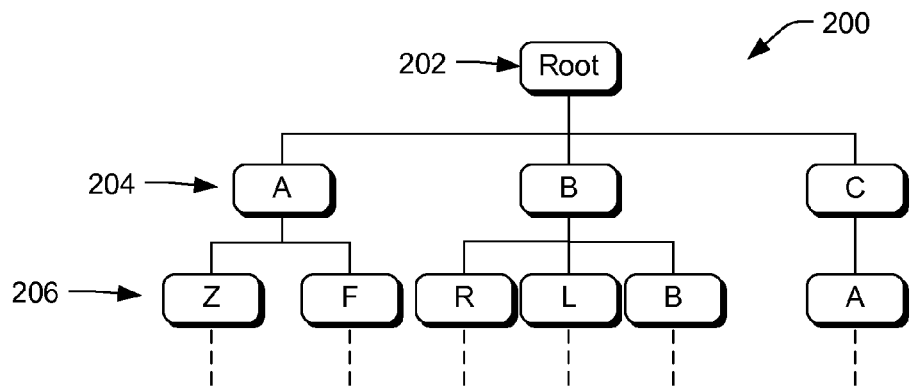
FIG. 2 is a schematic diagram illustrating a frequent pattern search technique.

FIG. 2 illustrates an initial or early definition of a pattern search space 200. The search space begins at an empty root level 202. Exploration of data items (which in this example are strings) reveals a first level 204 of the search space, with nodes corresponding to characters that may form the first elements of frequently occurring element patterns: "A", "B", and "C". Further exploration of the data items identifies a second level 206 of the search space, having nodes corresponding to characters that may follow the initial characters of the first level 204. For example, the characters "Z" and "F" have been found in the data set to follow occurrences of "A". The second level can alternatively be viewed as having nodes that correspond to sub-patterns, where the sub-pattern corresponding to a particular node is a concatenation of the elements of those nodes found along the path from the root node to the particular node. For example, a first-level node may corresponds to the pattern "A", and the second level nodes below the first-level node "A" might correspond to sub-patterns "AZ" and "AF", respectively.

Dashed lines leading from the nodes of the second level 206 indicate the possible existence of yet lower-level nodes and sub-patterns, which are as yet unexplored and thus unknown.

A node having dependent nodes can be referred to as a parent node. Nodes that depend from such a parent node can be referred to as child nodes or children. A node is said to have "support" that is equal to the number of data items that contain the sub-pattern defined by the node. In many situations, "frequently" occurring patterns are defined as those patterns having support that meets or exceeds a given threshold.

Given a search space definition as shown in FIG. 2, further exploration can be partitioned into separate tasks corresponding to the nodes of one of the levels of the defined space 200. For example, further exploration can be separated into three tasks corresponding to the three first-level nodes "A", "B", and "C". Each task is responsible for finding sub-patterns of its node. Alternatively, the further exploration might be partitioned into six tasks, corresponding to the nodes of the second level 206 of the search space. This type of partitioning can be performed at any level of the search space, assuming that exploration has been performed to reveal that level of the search space.

Referring again to FIG. 1, each of the processors 106 may be configured to execute a frequent pattern searching algorithm in a search task or process 118. In the described embodiment, the search space is partitioned as described above, and partitions of the frequent pattern search are assigned to each of the computing nodes 102. Sub-partitions of these partitions are then defined, based on lower-level nodes of the search space, and are assigned as tasks to each of the processors 106. Each processor conducts its sub-partition of the search against the data set 112, which is stored in the shared memory 108.

Note that in this embodiment, the entire data set 112 (containing all data items) is replicated in the shared memory 108 of each computing node 102, so that each search task 118 has access to the entire data set.

The computing nodes 102 include a head node 120 that executes a scheduler 122 to allocate partitions of the frequent pattern search to individual computing nodes 102. In addition, the processors 106 of each computing node 102 include a head processor 124 that executes a scheduler 126 to allocate sub-partitions of the frequent pattern search to individual processors 106 of the computing node 102. The head node 120 and the head processors 124 also dynamically reallocate the portions and sub-portions of the pattern search upon demand. Reallocation takes place first among the processors 106 of individual computing nodes 102, and secondarily among the computing nodes 102 when reallocation within a computing node is undesirable or impractical.

Figure 3:
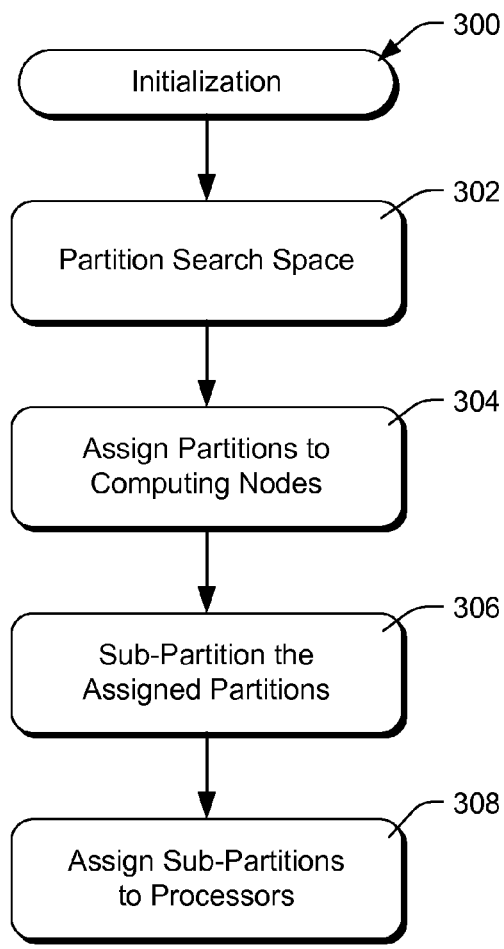
FIG. 3 is a flow diagram showing a procedures for partitioning and assigning a frequently occurring pattern search to multiple computing nodes and processors.

FIG. 3 illustrates an initial assignment or allocation 300 of tasks to computing nodes 102 and their processors 106. An action 302 comprises partitioning the overall search space into a plurality of partitions. This is performed as described above, by exploring and growing the search space to a predetermined level of granularity. In most cases, relatively high level nodes will be used to define the initial partitions of action 302.

At 304, the head node 120 assigns one or more of the initial partitions to each of the computing nodes 102. All identified partitions may be assigned at this point, or some partitions may be reserved for future assignment when individual computing nodes complete their initial assignments.

At 306, the head processor 124 of each computing node 102 sub-partitions any partitions that have been assigned to it, creating multiple sub-partitions. The head processor 124 uses techniques similar to those used by the head computing node 120 to identify sub-partitions, by exploring and growing the search space to identify sub-nodes or next-lower level nodes—nodes at a level or levels below the search space levels that were used by the head computing node 120 to identify the initial partitions. At 308, the sub-partitions are assigned to individual processors 106 of the computing nodes, by the head processor 124 of each computing node. All of the identified sub-partitions may be assigned at this point, or some sub-partitions may be reserved for future assignment when individual processors complete their initial assignments.

Figure 4:
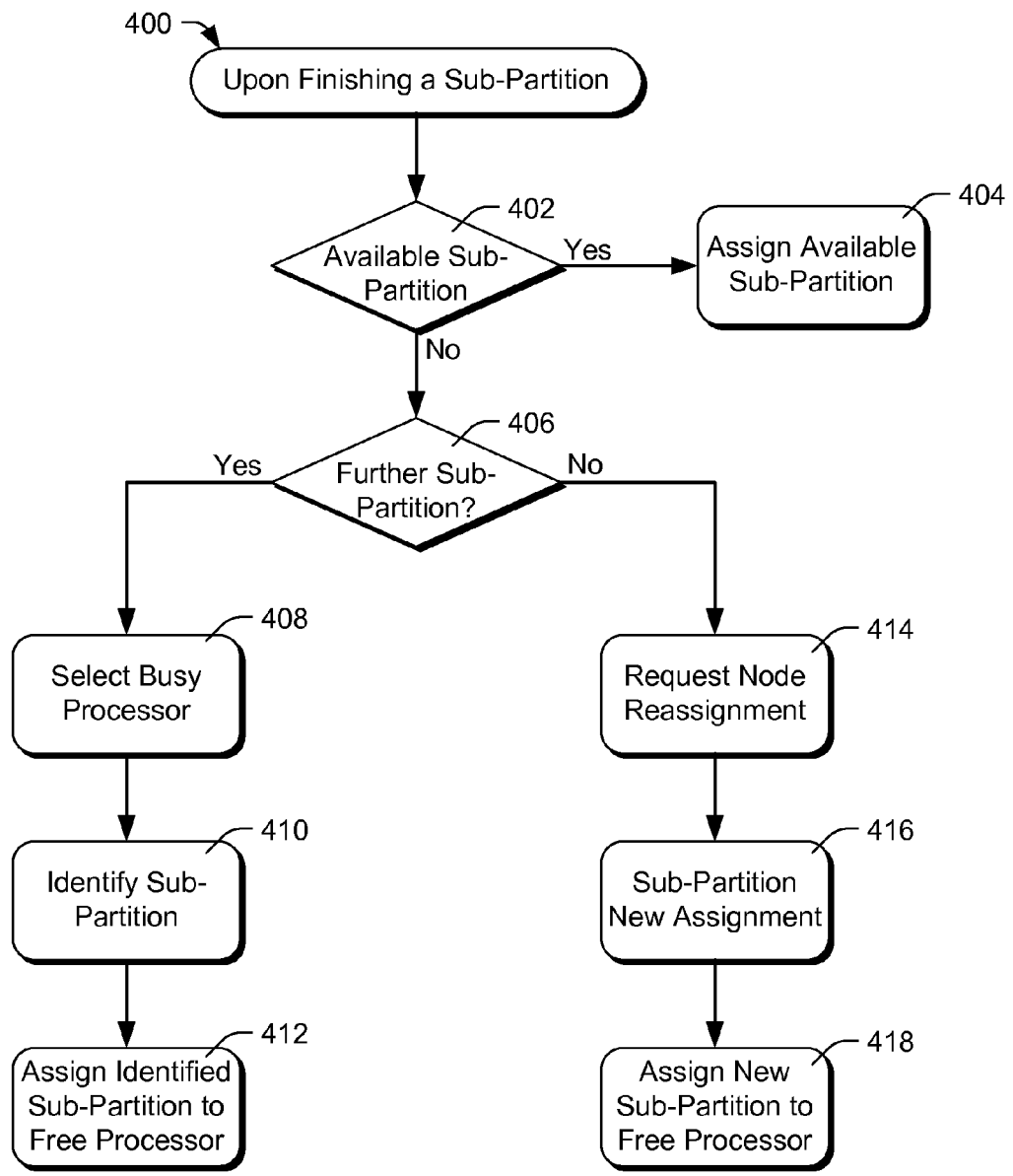
FIG. 4 is a flow diagram illustrating reallocation of search sub-partitions among processors of a computing node.

FIG. 4 illustrates an example process 400 for dynamically reallocating sub-partitions to individual processors 106. This process is initiated when a processor completes its current assignment, and thus runs out of work to perform. These actions are performed by the scheduler 126 of an individual computing node 102. The processor 106 that has run out of work will be referred to as a free processor. Other processors within the computing node will be referred to as busy processors.

At 402, the scheduler 126 determines whether any sub-partitions remain unassigned, resulting from any previous sub-partitioning efforts. If so, an action 404 is performed, comprising assigning one of these available sub-partitions to the free processor. The free processor commences searching in accordance with the assignment.

If there are no remaining unassigned sub-partitions, the scheduler determines at 406 whether it is desirable for one of the busy processors to relinquish part if its previously allocated sub-partition. This can accomplished by querying each of the busy processors to determine their estimated remaining work. Whether or not it is desirable to further sub-partition the work currently being processed by a busy processor is evaluated primarily based on the estimated work remaining to the busy processor. At some point, a processor will have so little work remaining that it will be inefficient to further sub-partition that work.

If at 406 there is at least one busy processor with sufficient remaining work that it would be efficient to sub-partition that remaining work, execution proceeds with the actions shown along the left side of FIG. 4. An action 408 comprises selecting one of the busy processors 106. This may be accomplished by evaluating the work remaining to each of the processors, and selecting the processor with the most remaining work.

At 410, the scheduler 126 or the selected busy processor itself may sub-partition the remaining work of the busy processor. For example, the remaining work may be sub-partitioned into two sub-partitions, based on currently known levels of the search space that the busy processor is currently exploring. At 412, one of the new sub-partitions is assigned to the free processor.

If at 406 there is not at least one busy processor with sufficient remaining work that it would be efficient to sub-partition that remaining work, execution proceeds with the actions shown along the right side of FIG. 4. An action 414 comprises requesting a new partition assignment or reassignment from the scheduler 122 of the head node 120. An action 416 comprises sub-partitioning the new assignment, using the techniques already described. An action 418 comprises assigning one of the resulting sub-partitions to the free processor. The remaining sub-partitions are held by the scheduler 126 for future assignment to other processors as they complete their current assignments.

Figure 5:
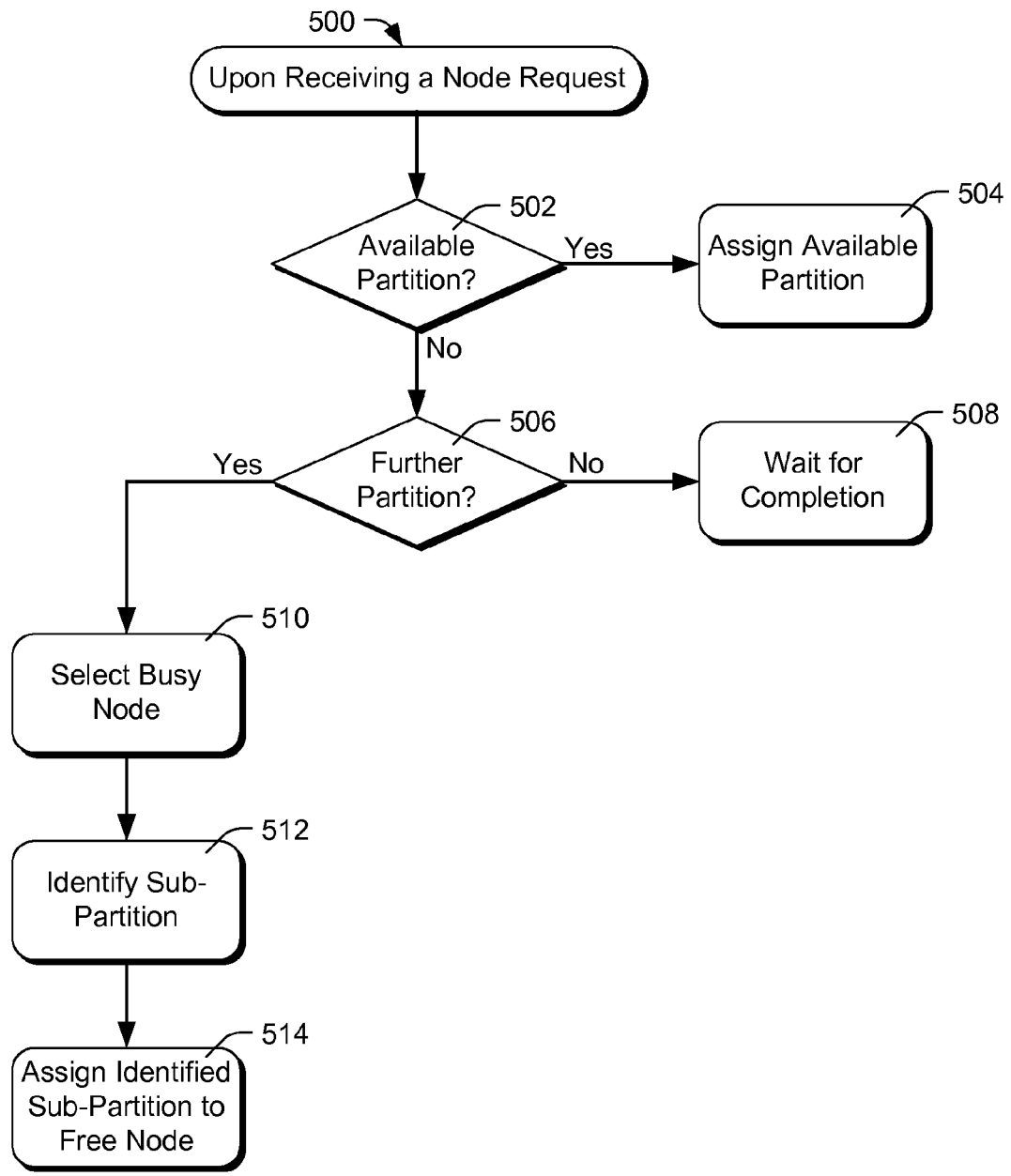
FIG. 5 is a flow diagram illustrating reallocation of search partitions among computing nodes.

FIG. 5 illustrates an example process 500 for dynamically reallocating search space partitions to individual computing nodes 102. This process is initiated upon receiving a request from a computing node, such as indicated at 414 of FIG. 4. These actions are performed by the scheduler 122 of the head node 120. The requesting computing node 102 that has run out of work will be referred to as a requesting computing node. Other computing node will be referred to as busy computer nodes.

At 502, the scheduler 122 determines whether any partitions remain unassigned, resulting from any previous partitioning efforts. If so, an action 504 is performed, comprising assigning one of these available partitions to the free computing node. The free computing node commences searching in accordance with the assignment, as described with reference to FIG. 4.

If there are no remaining unassigned partitions, the scheduler determines at 506 whether it is desirable for one of the busy computing nodes to relinquish part if its previously allocated partition. This can accomplished by querying each of the busy computing nodes to determine their estimated remaining work. Whether or not it is desirable to further partition the work currently being processed by a busy computing node is evaluated primarily based on the estimated work remaining to the busy computing node. At some point, a computing node will have so little work remaining that it will be inefficient to further partition that work. Note also that reassigning work from one computing node to another involves the busy computing node reassigning or redistributing work to among its individual processors.

If at 506 there is not at least one busy computing node with sufficient remaining work that it would be efficient to partition that remaining work, an action 508 is performed of simply waiting for the remaining computing nodes to complete their work. Otherwise, execution proceeds with the actions shown along the left side of FIG. 5. An action 510 comprises selecting one of the busy computing nodes 102. This may be accomplished by evaluating the work remaining to each of the computing nodes, and selecting the computing node with the most remaining work.

At 512, the scheduler 122 or the selected busy computing node itself may partition the remaining work of the busy computing node. For example, the remaining work may be partitioned into two sub-partitions, based on currently known sub-levels of the search space that the busy processor is currently exploring. At 514, one of the sub-partitions is assigned to the free computing node.

Using the techniques described above, reassignment of partitions and sub-partitions is performed dynamically, and is initiated when a processor or computing node completes its current assignment.

Partitioning, assignment, and reassignment may involve evaluating the amount of work associated with individual partitions or sub-partitions—also referred to as the "size" of the partition or sub-partition. In practice, the actual size of any partition is unknown, because that partition has not yet been fully explored, and only a complete exploration will reveal the size. However, partition and sub-partition sizes can be estimated or predicted.

More specifically, each partition or sub-partition may correspond to a sub-pattern of the search space. The support of the sub-pattern—the number of data items that contain the sub-pattern—is used on some embodiments as an estimate of the size of the partition. Partitions with higher support are predicted be larger than partitions with lower support. Alternatively, the sum of supports of the next-lower level nodes of the search space may be used to estimate the size of the sub-pattern. As a further alternative, for example when the algorithm in the reference cited above is used, the average sequence length of the projection database of immediate next-lower level nodes of the search space may be used as an indication or estimate of partition size.

Other types of estimations may be used in other embodiments.

Generally, reallocations and reassignments should be performed according to criteria that account for efficiency. For example, reassignments among the processors of computing nodes should be performed at a higher priority than reassignments among computing nodes. Furthermore, any reassignments should be performed in a way that contributes to balanced workloads among the processors and computing nodes. Also, granularity of reassignments should not be too small, because each reassignment involves significant overhead.

In some embodiments, the schedulers 122 and 126 may monitor remaining workload of the various computing nodes and processors. When work is reallocated, the schedulers account for this in their estimations. Furthermore, the schedulers may maintain estimation models to predict the remaining work of individual computing nodes and processors. The estimation models may be updated or adjusted in response to actual performance of the searching, so that the models become more accurate over time.

CONCLUSION

Illustrative systems and methods of conducting frequent pattern mining are described above. The illustrative methods are illustrated as a collections of blocks in logical flow graphs, representing sequences of operations that can be implemented in hardware, software, firmware, or a combination thereof. Certain features of the systems and acts of the methods need not be arranged in the order described, may be modified, and/or may be omitted entirely, depending on the circumstances.

Also, any of the acts described above with respect to any method may be implemented by a processor or other computing device based on instructions stored on one or more computer-readable storage media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, although the disclosure uses language specific to structural features and/or methodological acts, the invention is not limited to the specific features or acts described. Rather, the specific features and acts are disclosed as illustrative forms of implementing the invention.

The invention claimed is:

1. A computer system, comprising:
a particular computing node of a plurality of computing nodes being configured to allocate partitions of an element pattern search space among the plurality of computing nodes, wherein the particular computing node comprises a first processor and a second processor, and the first processor is configured to:
allocate, to the second processor of the particular computing node, a first sub-partition of a partition of the element pattern search space allocated to the particular computing node;
reserve allocation of a second sub-partition of the partition for subsequent allocation upon receiving a request for an assignment of a reserved sub-partition from the second processor;
receive, from the second processor of the particular computing node, the request for the assignment based at least in part on the second processor completing the first sub-partition that is allocated to the second processor; and
based at least in part on receiving the request for the assignment from the second processor, allocate to the second processor, the second sub-partition that is reserved for subsequent allocation.

2. The computer system of claim 1, wherein the first processor is further configured to re-allocate sub-partitions from busy processors of the particular computing node to idle processors of the particular computing node.

3. The computer system of claim 1, wherein the first processor of the particular computing node is further configured to:
determine that all sub-partitions of the partition of the element pattern search space allocated to the particular computing node have been allocated; and re-allocate a third sub-partition from the first processor to the second processor based at least in part on the second processor completing the second sub-partition.

4. The computer system of claim 1, wherein the first processor of the particular computing node is further configured to adjust sub-partitions of the partition of the element pattern search space allocated among the first processor and the second processor in response to completion of respective searches of sub-partitions previously allocated to at least one of the first processor or the second processor.

5. The computer system of claim 1, wherein the first sub-partition is associated with a respective sub-pattern of the element pattern search space, and the first sub-partition is allocated to the second processor based at least in part on an estimation of a size of the first sub-partition, wherein the estimation of the size of the first sub-partition is based at least in part on a number of items of the element pattern search space that include the respective sub-pattern associated with the first sub-partition.

6. A computer system, comprising:
a computing node configured to receive partitions of an element pattern search space from one or more of a plurality of computing nodes, wherein the one or more of the plurality of computing nodes are allocated other partitions of the element pattern search space, and wherein the computing node includes a first processor and a second processor, the first processor configured to:
determine an allocation among the first processor and the second processor of sub-partitions of the partitions of the element pattern search space received by the computing node, wherein respective processors of the first processor and the second processor are configured to perform a search of a respective allocation of the sub-partitions of the element pattern search space;
receive, from the second processor, a request for an additional sub-partition in response to a completion of respective searches of sub-partitions previously allocated to the second processor;
determine that all of the sub-partitions of the partitions of the element pattern search space have been allocated among the first processor and the second processor; and
based at least in part on receiving the request and determining that all of the sub-partitions have been allocated, adjust one or more of the sub-partitions allocated to the first processor and the second processor by altering the allocation of the one or more of the sub-partitions of the partitions of the element pattern search space to a different allocation of the one or more of the sub-partitions of the partitions of the element pattern search space.

7. The computer system of claim 6, wherein the computing node further comprises memory that is commonly accessible by the first processor and the second processor of the computing node, wherein each of the first processor and the second processor of the computing node accesses a common data set from the memory to perform the search of the respective allocation of the sub-partitions of the element pattern search space.

8. The computer system of claim 6, wherein altering the allocation of the one or more of the sub-partitions of the partitions of the element pattern search space to the different allocation comprises re-allocating the additional sub-partition of the partitions of the element pattern search space from the first processor to the second processor.

9. The computer system of claim 6, wherein the computing node further includes a third processor, and wherein altering the allocation of the one or more of the sub-partitions of the partitions of the element pattern search space to the different allocation comprises re-allocating a previously allocated sub-partition of the partition of the element pattern search space from the third processor to the second processor.

10. The computer system of claim 6, wherein the first processor is further configured to allocate a first sub-partition of the sub-partitions based at least in part on an estimation of a number of items of the element pattern search space that include a respective sub-pattern associated with the first sub-partition.

11. A method comprising:
allocating a portion of a partition to a computing node, wherein the partition is one of multiple partitions of an element pattern search space, wherein the computing node includes a first processor and a second processor, and the computing node is one of a plurality of computing nodes;
identifying sub-partitions of the partition allocated to the computing node, the sub-partitions including at least a first sub-partition and a second sub-partition;
reserving allocation of the first sub-partition for subsequent allocation upon receiving a request for an assignment of a reserved sub-partition from at least one of the first processor or the second processor;
allocating the second sub-partition to the first processor of the computing node;
receiving, based at least in part on the first processor completing a search of the second sub-partition, the request for the assignment from the first processor; and
based at least in part on receiving the request for the assignment, allocating the first sub-partition to the first processor.

12. The method of claim 11, wherein the allocating the second sub-partition comprises estimating a size of the second sub-partition based at least in part on a number of items of the element pattern search space that include a respective sub-pattern associated with the second sub-partition.

13. The method of claim 11, wherein the second sub-partition is associated with a dependent sub-partition, and wherein the allocating the second sub-partition further comprises estimating a size of the second sub-partition based at least in part on a sum of a number of items of the element pattern search space that include the dependent sub-partition associated with the second sub-partition.

14. The method of claim 11, the sub-partitions further including a third sub-partition and a fourth sub-partition, and the method further comprising identifying and allocating the third sub-partition of the partition of the element pattern search space to the second processor in response to a completion of the fourth sub-partition previously allocated to the second processor.

15. The method of claim 11, further comprising configuring the first processor and the second processor of the computing node to access the data items from a shared memory that is local to the computing node.

16. The method of claim 11, further comprising configuring the first processor and the second processor of the computing node to access data items from a shared randomly-addressable memory that is local to the computing node.

17. The method of claim 11, further comprising configuring the first processor and the second processor of the computing node to access data items from a shared high-speed memory that is local to the computing node.

18. The method of claim 11, the sub-partitions further including a third sub-partition, and the method further comprising:
allocating the third sub-partition to the second processor;

determining that the second processor is busy based at least in part on an estimated amount of work remaining on the second processor; and re-allocating the third sub-partition from the second processor to the first processor.

19. The method of claim 11, further comprising dynamically adjusting allocations of partitions to the computing node as searches of the element pattern search space are conducted.

20. The method of claim 11, further comprising dynamically adjusting allocations of partitions to the computing node in response to completion of searches of one or more partitions previously allocated to the computing node.

* * * * *